(No Model.)

J. F. CUNNINGHAM, Sr.
COTTON CLEANING MACHINE.

No. 266,106. Patented Oct. 17, 1882.

Witnesses;
Ed. J. Underwood
Jno. G. McGill, Jr.

Inventor
James F. Cunningham Sr
By
R. A. Burton
Atty

N. PETERS, Photo-Lithographer, Washington, D.C.

UNITED STATES PATENT OFFICE.

JAMES F. CUNNINGHAM, SR., OF SOUTH FORK, ARKANSAS.

COTTON-CLEANING MACHINE.

SPECIFICATION forming part of Letters Patent No. 266,106, dated October 17, 1882.

Application filed May 10, 1882. (No model.)

*To all whom it may concern:*

Be it known that I, JAMES F. CUNNINGHAM, Sr., a citizen of the United States, residing at South Fork township, in the county of Fulton and State of Arkansas, have invented certain new and useful Improvements in Cotton-Cleaning Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to machines for cleaning seed-cotton; and it consists in the details of construction and combinations of the several parts, as will be hereinafter more fully set forth in the specification and claims and shown in the accompanying drawings, in which—

Figure 1:
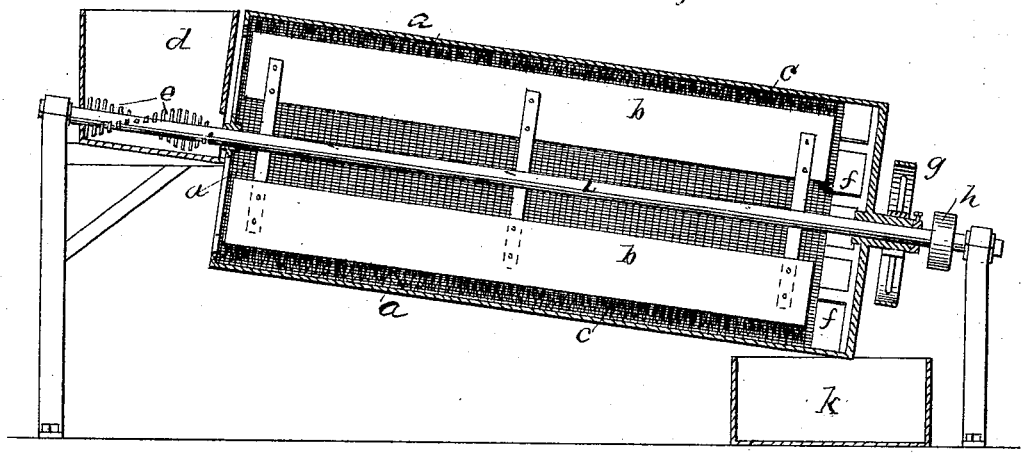
Figure 2:
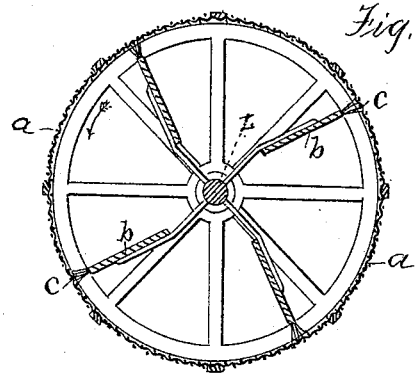

Figure 1 is a longitudinal section of my device, and Fig. 2 a cross-section of the same.

Referring more particularly to the drawings, $d$ represents a hopper, into which the cotton is poured preparatory to being cleaned.

$a$ represents a wire cylinder of suitable length, and inclined from hopper $d$ to receptacle K, and this cylinder is made with meshes large enough to let the leaves, limbs, dirt, sand, and other foreign substances pass freely through and yet retain the cotton-seed. Passing through this cylinder and hopper $d$ is a shaft, L, for actuating said cylinder, the fan-blades $b$, and the pins $e$, set spirally on the shaft. The outer edges of the fan-blades are provided with flexible brushes $c$, made of bristles or other suitable material, which reach to the wire cylinder. The fan-blades have a backward slant, so that as they revolve they will force the air out through the cotton and wire, thus aiding the centrifugal force to keep the cotton out against the cylinder, while the "trash" is forced out as soon as it is loosened by the rapidly-moving blades and brushes. The wire cylinder revolves more slowly than the blades $b$ for the purpose of keeping the cotton from settling at the bottom and to keep it continually dropping on the fan, and to prevent choking and to aid its discharge into openings $f$, and thence into receptacle K. The cotton is gradually fed into the cylinder by means of the spiral pins $e$, which carry it downward into the cylinder. The cylinder is revolved more or less rapidly and the cotton retained for a greater or less time, according to the amount of trash. Neatly-picked hand-gathered cotton can be put through quickly; but when picked by machinery more time is required. By this means the cotton is thoroughly cleansed, is more valuable, is loosened up, and gins cleaner, making more and better lint and cleaner and more valuable seed.

The shaft L may be actuated by a band-pulley, $h$, or other suitable mechanism. The cylinder $a$ is actuated by a band-pulley, $g$.

Having thus described my invention, what I claim as new, and desire to secure by Letters Patent, is—

1. In a cotton-cleaning machine, the combination of an inclined wire cylinder and a hopper, $d$, with a shaft, L, provided with fan-blades and spiral pins $e$, and suitable mechanism for actuating said shaft and wire cylinder, substantially as and for the purpose set forth.

2. In a cotton-cleaning machine, the combination of the inclined wire cylinder $a$, having discharge-openings $f$, and shaft L, provided with fan-blades $b$, brushes $c$, and the spiral pins $e$, with the hopper $d$ and receptacle K, substantially as and for the purpose set forth.

In testimony whereof I affix my signature in presence of two witnesses.

JAMES FRANKLIN CUNNINGHAM, SR.

Witnesses:
S. H. WHITE,
ROBT. B. MAXEY.